(12) United States Patent
Kim et al.

(10) Patent No.: US 9,994,007 B2
(45) Date of Patent: Jun. 12, 2018

(54) APPARATUS FOR GRAPHENE WET TRANSFER

(71) Applicant: KOREA INSTITUTE OF SCIENCE AND TECHNOLOGY, Seoul (KR)

(72) Inventors: Chulki Kim, Seoul (KR); Seok Lee, Seoul (KR); Jae Hun Kim, Seoul (KR); Taikjin Lee, Seoul (KR); Minah Seo, Seoul (KR); Jaebin Choi, Seoul (KR); Young Min Jhon, Seoul (KR); Deok Ha Woo, Seoul (KR); Chaehyun Lim, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 19 days.

(21) Appl. No.: 15/044,586

(22) Filed: Feb. 16, 2016

(65) Prior Publication Data
US 2017/0028692 A1    Feb. 2, 2017

(30) Foreign Application Priority Data

Jul. 30, 2015  (KR) .................... 10-2015-0107955

(51) Int. Cl.
*B32B 37/00*  (2006.01)
*C01B 32/184*  (2017.01)
(Continued)

(52) U.S. Cl.
CPC ........ *B32B 37/025* (2013.01); *B32B 37/0046* (2013.01); *C01B 32/184* (2017.08);
(Continued)

(58) Field of Classification Search
None
See application file for complete search history.

(56) References Cited

U.S. PATENT DOCUMENTS 8,076,244 B2 * 12/2011 Dando .............. H01L 21/67075
                                                      438/667
2007/0084560 A1 * 4/2007 Fuentes ............ H01L 21/67057
                                                      156/345.11
(Continued)

FOREIGN PATENT DOCUMENTS

KR   10-2012-0124506 A    11/2012
KR   10-2013-0028582 A     3/2013
(Continued)

OTHER PUBLICATIONS

Machine Generated English Translation of KR20140096648. Published Aug. 6, 2014. held to Dong Gwon Won.*

*Primary Examiner* — Sylvia MacArthur
(74) *Attorney, Agent, or Firm* — Goldilocks Zone IP Law (57) ABSTRACT

Disclosed is an apparatus for graphene wet transfer, which includes: a reservoir body having at least two reservoirs; a barrier structure located on the reservoir and having at least one separated space formed by barriers; and a substrate frame located below the barrier structure and having at least one substrate accommodation groove for accommodating a target substrate to which graphene is transferred. Here, each reservoir may be filled with a solution for a wet transfer process, and the graphene may be separately located in each separated space in a floating state in the solution.

12 Claims, 8 Drawing Sheets

(51) Int. Cl.
  *B05C 3/09*     (2006.01)
  *B05C 3/10*     (2006.01)
  *B05D 1/20*     (2006.01)
  *B05C 3/109*    (2006.01)

(52) U.S. Cl.
  CPC ............... *B05C 3/09* (2013.01); *B05C 3/10* (2013.01); *B05C 3/109* (2013.01); *B05D 1/206* (2013.01); *B32B 2264/108* (2013.01)

(56) References Cited

U.S. PATENT DOCUMENTS

| | | | | |
|---|---|---|---|---|
| 2013/0048339 | A1* | 2/2013 | Tour | H01B 1/04 174/126.1 |
| 2013/0174968 | A1* | 7/2013 | Vlassiouk | C01B 31/0453 156/155 |
| 2014/0147675 | A1 | 5/2014 | Han et al. | |
| 2015/0014600 | A1* | 1/2015 | Jeon | C01B 31/0446 252/502 |
| 2015/0307358 | A1* | 10/2015 | Yoon | C01B 31/0453 427/172 |
| 2017/0028692 | A1* | 2/2017 | Kim | B32B 37/025 |

FOREIGN PATENT DOCUMENTS

| | | |
|---|---|---|
| KR | 10-2013-0031074 A | 3/2013 |
| KR | 10-2014-0032266 A | 3/2014 |
| KR | 10-1400723 B | 5/2014 |
| WO | 2014/038752 A1 | 3/2014 |

\* cited by examiner

Fig. 5C ly. This one fold graphene,
APPARATUS FOR GRAPHENE WET TRANSFER

CROSS-REFERENCE TO RELATED APPLICATION

This application claims priority to Korean Patent Application No. 10-2015-0107955, filed on 30 Jul. 2015, and all the benefits accruing therefrom under 35 U.S.C. § 119, the contents of which in its entirety are herein incorporated by reference.

BACKGROUND

1. Field

The present disclosure relates to a graphene device process, and more particularly, to a technique for wet transfer of graphene.

2. Description of the Related Art

Generally, graphene can be obtained from one fold of a carbon bond layer which configures graphite, and this one fold of graphene has an advantage of excellent carrier mobility in comparison to silicon. This one fold graphene, namely a single-layer graphene may be composed by means of chemical vapor deposition (CVD) using a transition metal (for example, Pt, Ni, Cu) as a catalyst. However, the composed graphene is strongly bonded to the transition metal layer which has been used as a catalyst, and it should be separated from the transition metal for usage. The separated graphene is afterwards carried to a desired substrate (namely, a target substrate), and the target substrate may have various configurations depending on its usage. The separating process and the separated graphene carrying process used at this time are collectively called a graphene transfer process. The graphene transfer process is one of most basic and important processes in fabrication and development of a graphene device.

Techniques related to the graphene transfer process are classified into two kinds depending on the method for separating a transition metal film where graphene is grown. Among them, as a representative technique, a metallic etching solution in a liquid state is used to remove a transition metal film at a lower side, which is called wet transfer. In another technique, a metallic etching solution in a liquid state is not used but graphene is mechanically and physically separated from the transition metal film, which is called dry transfer (for example, a roll-to-roll method or a stamping method).

However, if existing wet transfer and dry transfer are used, while graphene is being transferred to a surface of a target substrate, the graphene is highly likely to be damaged due to tear or bending, which deteriorates characteristics of a produced graphene device. In particular, in the dry transfer technique, a pressure of about 0.2 MPa is applied to graphene while the graphene is being carried to a polymer support and while the graphene is being transferred to a target substrate, which has great possibility of physical damage. In addition, in the wet transfer technique, while graphene floating in an etching solution or a washing solution is being picked up, the graphene is highly likely to be torn or bent.

RELATED LITERATURES

Patent Literature

Korean Unexamined Patent Publication No. 10-2013-0028582

SUMMARY

The present disclosure is directed to providing an apparatus and method for graphene wet transfer, which may protect graphene against an external force artificially generated during a wet transfer process so that the graphene may be stably transferred to a target substrate without damage.

In one aspect, there is provided an apparatus for graphene wet transfer, which includes: a reservoir body having at least two reservoirs; a barrier structure located on the reservoir and having at least one separated space formed by barriers; and a substrate frame located below the barrier structure and having at least one substrate accommodation groove for accommodating a target substrate to which graphene is transferred. Here, each reservoir may be filled with a solution for a wet transfer process, and the graphene may be separately located in each separated space in a floating state in the solution.

In an embodiment, the apparatus for graphene wet transfer may further include a moving mechanism configured to allow the barrier structure to move in a horizontal direction between upper portions of the reservoirs.

In an embodiment, a lower surface of the graphene may be bonded to a catalyst metal at which the graphene is grown, and an upper surface of the graphene may be bonded to a graphene support layer which supports the graphene.

In an embodiment, each horizontal surface of the separated space may have the same vertical axis as each horizontal surface of the substrate accommodation groove corresponding thereto.

In an embodiment, an outline of each horizontal surface of the separated space may match with an outline of each horizontal surface of the substrate accommodation groove corresponding thereto.

In an embodiment, an area of each horizontal surface of the separated space may be equal to or smaller than an area of each horizontal surface of the substrate accommodation groove corresponding thereto.

In an embodiment, the substrate accommodation groove may have a bottom surface with a predetermined slope.

In an embodiment, the substrate accommodation groove may have a plurality of holes for draining the solution.

In an embodiment, the substrate frame may be detachable.

In an embodiment, the at least two reservoirs may be separated by at least one dividing wall from each other, and an upper portion of the dividing wall may be made of a shielding material in order to minimize movement of the solution while the barrier structure is moving between upper portions of the reservoirs.

In an embodiment, each of the at least two reservoirs may further include at least one valve for introducing the solution into the reservoir or discharging the solution out of the reservoir.

In an embodiment, the apparatus for graphene wet transfer may further include a level control pipe connected to each of the at least two reservoirs to adjust a level of a solution filled in each reservoir.

In another aspect, there is provided a method for graphene wet transfer, which includes: etching a catalyst metal bonded to a lower surface of graphene by locating a barrier structure on a first reservoir filled with an etching solution and locating the graphene separately in each separated space of the barrier structure in a floating state in the etching solution; washing the etching solution by horizontally moving the barrier structure from the first reservoir onto a second reservoir filled with a washing solution; and transferring the graphene to a corresponding target substrate by locating a substrate frame accommodating at least one target substrate on the first reservoir filled with the washing solution, horizontally moving the barrier structure from the second reservoir onto the substrate frame of the first reservoir, and discharging the washing solution from the first reservoir. Here, while the barrier structure is moving from the first reservoir to the second reservoir or from the second reservoir to the first reservoir, the graphene may be separately located in each separated space in a floating state in the etching solution or the washing solution.

According to the present disclosure, since a wet transfer process may be standardized and systematized by excluding manual works for carrying graphene, it is possible to reduce errors in the process and damage (for example, tear, bending, wrinkles) of graphene caused by an external force. By doing so, it is possible to prevent deterioration of electric characteristics such as carrier mobility of graphene caused by damage of graphene during the graphene transfer process, and it is also possible to enhance a transfer yield of graphene.

In addition, according to the present disclosure, since graphene may be transferred to target substrates of various sizes and shapes, the transferred graphene may be utilized for various graphene-based active devices, for example a flexible display, a flexible solar cell, a transparent display, a graphene-based ultrahigh-speed transistor or the like.

DETAILED DESCRIPTION

Exemplary embodiments now will be described more fully hereinafter with reference to the accompanying drawings, in which exemplary embodiments are shown. However, the present disclosure should not be construed as limited to the exemplary embodiments set forth therein.

Terms used in the present disclosure are selected as general terms widely used at the present in consideration of their functions, but they may be varied depending on the intention or custom of technicians in the art or appearance of new technologies. In addition, in specific cases, the applicant selects a term arbitrarily, and in this case, its meaning will be described in the specification. Therefore, the terms used in the present disclosure should be interpreted based on substantial meaning of the terms and overall contents of the present disclosure, without being limited simply to their names.

In the present disclosure, an apparatus for graphene wet transfer represents an apparatus for wet-transferring at least one graphene in a lump to a target substrate. At this time, each graphene may grow on one surface (for example, an upper surface) of a catalyst metal (for example, Pt, Ni, Cu), and one surface (for example, an upper surface) of the graphene where a catalyst metal is not disposed may be bonded to a graphene support layer.

Here, the graphene support layer represents a layer which is bonded to one surface of graphene to support the graphene. In an embodiment, the graphene support layer may be made of corrosion-resisting material floating in a solution used in a wet transfer process so that the graphene may float in the solution. For example, the graphene support layer may be made of polymer material with corrosion resistance (for example, teflon, polyethylene terephthalate (PET), polydimethylsiloxane (PDMS)), without being limited thereto. In an embodiment, the graphene support layer may be configured with various shapes depending on the form of graphene. At this time, the graphene support layer may be configured to cover some surface (for example, a rim) of the upper surface of the graphene so that most other regions are exposed. For example, the graphene support layer may have a ring shape or a square band shape covering a rim of the upper surface of the graphene, without being limited thereto. As described above, the apparatus for graphene wet transfer according to the present disclosure does not use a polymethylmethacrylate (PMMA) support layer which has been used in the existing technique but uses a graphene support layer prepared in advance with a desired shape, and thus the graphene to be used for fabricating an actual device is not easily contaminated by "polymer residues".

Figure 1:
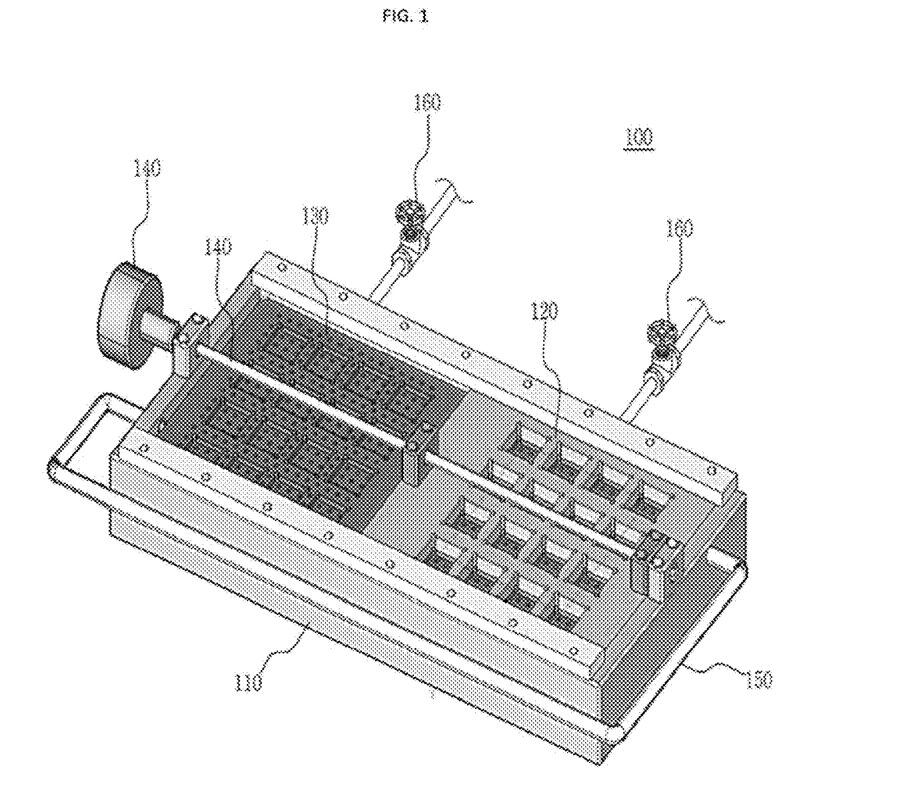
FIG. 1 is a perspective view showing an apparatus for graphene wet transfer according to an embodiment of the present disclosure.
Figure 2:
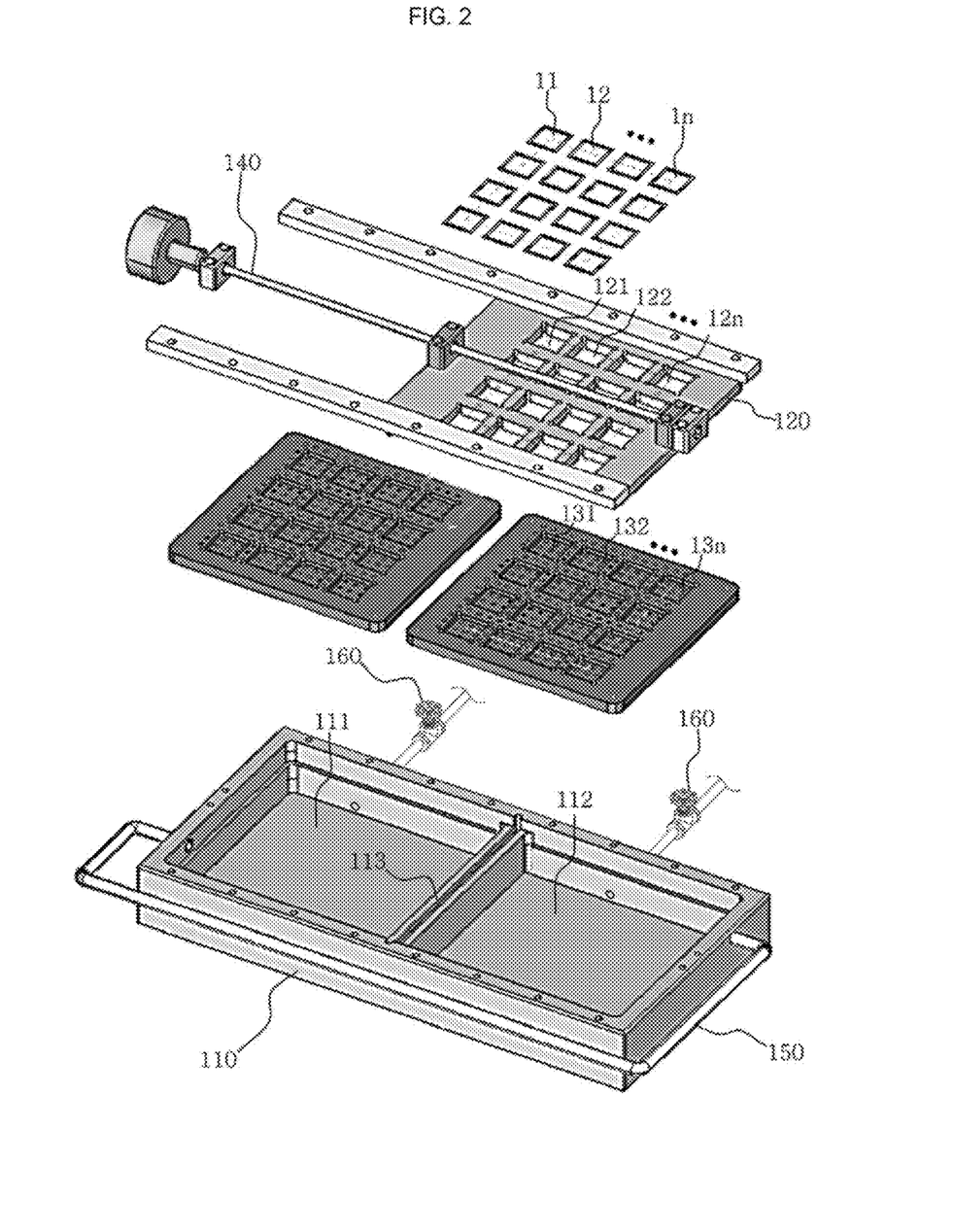
FIG. 2 is an exploded perspective view showing an apparatus for graphene wet transfer according to an embodiment of the present disclosure.

Referring to FIGS. 1 and 2, the apparatus 100 for graphene wet transfer (hereinafter, also referred to as a graphene wet transfer apparatus 100) may include a reservoir body 110, a barrier structure 120 and at least one substrate frame 130. In addition, the graphene wet transfer apparatus 100 may further include a moving mechanism 140 and a level control pipe 150. As shown in FIG. 2, each graphene 11, 12, . . . , 1n growing on the catalyst metal may be bonded to a graphene support layer (for example, a graphene support layer having a square band shape as depicted) at its upper surface.

In the present disclosure, the reservoir body 110 is a body of the graphene wet transfer apparatus 100 which includes a plurality of reservoirs filled with solutions used for the wet transfer process and may accommodate a barrier structure 120 and a substrate frame 130, described later. Here, the solution may include an etching solution (for example, ion chloride ($FeCl_3$), iron nitride ($Fe(No_3)_3$), copper chloride ($CuCl_2$), ammonium sulfate ($(NH_4)_2S_2O_8$), sodium persulfate ($Na_2S_2O_8$) solution and sulfur perhydride-type solution) for etching a catalyst metal at which graphene is grown, or a washing solution (for example, distilled water) for washing the etching solution.

In an embodiment, the reservoir body 110 may include at least two reservoirs separated from each other by a dividing wall. For example, as shown in FIG. 2, the reservoir body 110 may include two reservoirs, for example a first reservoir 111 and a second reservoir 112, separated by a single dividing wall 113. In another example, the reservoir body 110 may include three or more reservoirs separated by at least two dividing wall 113 and arranged in a length direction. At this time, an upper portion of the dividing wall 113 may be made of a shielding material in order to minimize movement of a solution filed in each reservoir while the barrier structure 120, described later, is moving between the reservoirs. At this time, the shielding material may be made of corrosion-resisting material (for example, rubber). By doing so, when the barrier structure 120 is moving, movement of the solution may be minimized so that each reservoir keeps a stable level, thereby preventing graphene from being damaged during the etching and washing processes.

In an embodiment, each reservoir may include at least one valve 160 for introducing the solution into a reservoir or discharging the solution out of the reservoir. At this time, the valve 160 may be configured so that a solution may flow in or out at a regular rate.

In an embodiment, each reservoir may be connected to the level control pipe 150 for controlling a level of the solution filled in the reservoir. By using the level control pipe 150, each reservoir may keep a stable level during the wet transfer process.

In the present disclosure, the barrier structure 120 represents a structure including at least one separated space 121, 122 or the like formed by barriers. Here, the separated spaces 121, 122 or the like represents spaces where graphene 11, 12, ..., 1n is separately located in a floating state in the solution during the wet transfer process.

Figure 3:
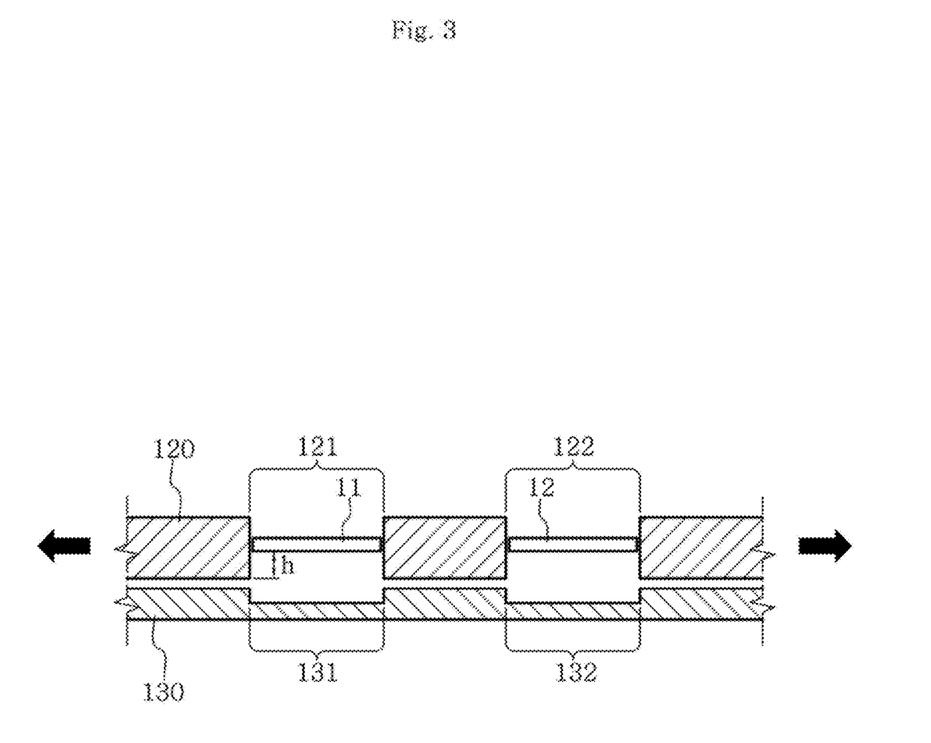
FIG. 3 is a cross-sectional view showing a barrier structure and a substrate frame, employed at the apparatus for graphene wet transfer according to an embodiment of the present disclosure.

Referring to FIG. 3, in the wet transfer process, the etching solution and the washing solution may be filled to a certain height (h) of each separated space 121, 122 or the like, and at this time, the graphene 11, 12, ..., 1n may be separately located in each separated space 121, 122, ..., 12n in a floating state in the solution. By doing so, while the wet transfer process is being performed, since the graphene 11, 12, ..., 1n is separately located, it is possible to prevent the graphene 11, 12, ..., 1n from being damaged due to contact with each other during the wet transfer process.

In an embodiment, the barrier structure 120 may be located on the reservoir. For example, the barrier structure 120 may be located on the first reservoir 111 or the second reservoir 112. In addition, a horizontal surface of each separated space 121, 122, ..., 12n of the barrier structure 120 may have various shapes depending on the shape of the graphene 11, 12, ..., 1n or the shape of a target substrate to which the graphene 11, 12, ..., 1n is transferred. For example, the horizontal surface of the each separated space 121, 122, ..., 12n may have a ring shape or a square shape, without being limited thereto.

In an embodiment, the barrier structure 120 may be automatically or manually moved in a horizontal direction between the reservoirs. For example, the barrier structure 120 may be horizontally moved to the second reservoir 112 filled with a washing solution in order to perform a washing process, after performing the etching process at the first reservoir 111 filled with an etching solution. In another example, the barrier structure 120 may be horizontally moved to the first reservoir 111 filled with a washing solution and having the substrate frame 130 accommodating a target substrate in order to perform a transfer process, after performing the washing process at the second reservoir 112 filled with a washing solution.

In an embodiment, the barrier structure 120 may be moved in a horizontal direction by means of the moving mechanism 140. Here, the moving mechanism 140 is a unit for horizontally moving the barrier structure 120, and for example, as shown in FIGS. 1 and 2, the moving mechanism 140 may be a spiral shaft attached to a top of the barrier structure 120 to horizontally move the barrier structure 120, without being limited thereto. By using the moving mechanism 140, the barrier structure 120 may be stably moved at a regular speed from one reservoir to another reservoir.

Referring to FIG. 3, if the barrier structure 120 is moved in a horizontal direction in this way, the graphene 11, 12, ..., 1n separately located in each separated space 121, 122, ..., 12n may be moved to another reservoir in a state of being separated in each separated space 121, 122, ..., 12n. By doing so, a wet transfer process may be performed to the graphene 11, 12, ..., 1n without artificially picking up the graphene 11, 12, ..., 1n from the solution and moving to another reservoir, and thus it is possible to prevent the graphene 11, 12, ..., 1n from being torn or bent, which is caused while the graphene 11, 12, ..., 1n is being picked up.

In the present disclosure, the substrate frame 130 represents a frame for transfer, which accommodates a target substrate to which the graphene 11, 12, ..., 1n is transferred. In an embodiment, the substrate frame 130 may be located below the barrier structure 120. In addition, the substrate frame 130 may be detachable.

In an embodiment, the substrate frame 130 may include at least one substrate accommodation groove 131, 132, ..., 13n for accommodating a target substrate. At this time, each substrate accommodation groove 131, 132, ..., 13n may be configured so that the graphene 11, 12, ..., 1n separately located in each separated space 121, 122, ..., 12n in a floating state in the solution may be respectively transferred to each corresponding target substrate.

Referring to FIG. 3, in an embodiment, each horizontal surface of the substrate accommodation grooves 131, 132 may be configured to have the same vertical axis as each horizontal surface of the separated spaces 121, 122. In addition, an outline of each horizontal surface of the substrate accommodation grooves 131, 132 may be configured to substantially match with an outline of each horizontal surface of the separated spaces 121, 122 corresponding thereto. In addition, an area of each horizontal surface of the substrate accommodation grooves 131, 132 may be configured to be equal to or greater than an area of each horizontal surface of the separated spaces 121, 122 corresponding thereto. By doing so, the graphene 11, 12 separately located in each separated space 121, 122 in a floating state in the solution may stably sink as the solution is discharged at a regular speed, and thus the graphene 11, 12 may be transferred to a corresponding target substrate.

In an embodiment, the substrate accommodation groove 131, 132, ..., 13n may include a plurality of holes for discharging a solution. Since the solution is discharged through the plurality of holes, the graphene 11, 12, ..., 1n floating in the solution may be stably transferred to the target substrate.

Figure 6:
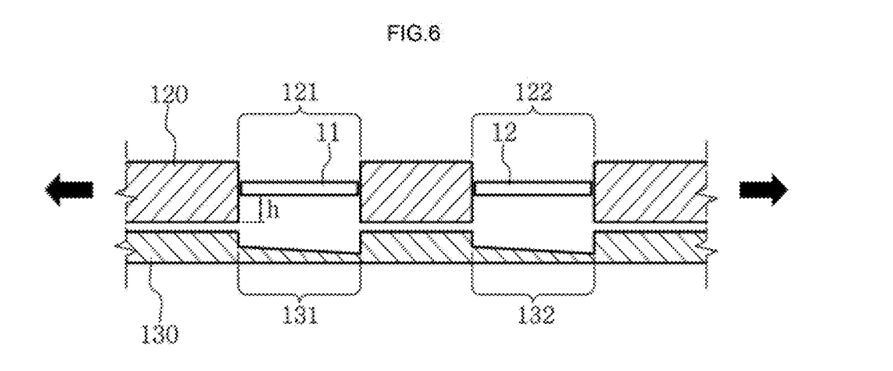
FIG. 6 is a cross-sectional view showing a substrate accommodation groove having a bottom surface with a predetermined slope, employed at the apparatus for graphene wet transfer according to an embodiment of the present disclosure.

Referring to FIG. 6, in an embodiment, the substrate accommodation groove 131, 132, ..., 13n may have a bottom surface with a predetermined slope. At this time, the slope of the bottom surface may be set to minimize a frictional force when the graphene 11, 12, ..., 1n is transferred to the target substrate. By doing so, a frictional force caused when the graphene 11, 12, . . . , 1*n* is transferred to the target substrate as the solution is discharged may be reduced, and thus the graphene 11, 12, . . . , 1*n* may be stably transferred to the target substrate without great damage.

Hereinafter, for convenience, a method for wet-transferring at least one graphene 11, 12, . . . , 1*n* in a lump by using the graphene wet transfer apparatus 100 including the reservoir body 110 with two reservoirs will be described in detail. However, this is just an embodiment, and this method may be applied in an identical or similar way to a method for wet-transferring graphene 11, 12, . . . , 1*n* by using a graphene wet transfer apparatus 100 including the reservoir body 110 with more than two reservoirs, as obvious to those skilled in the art.

Figure 4:
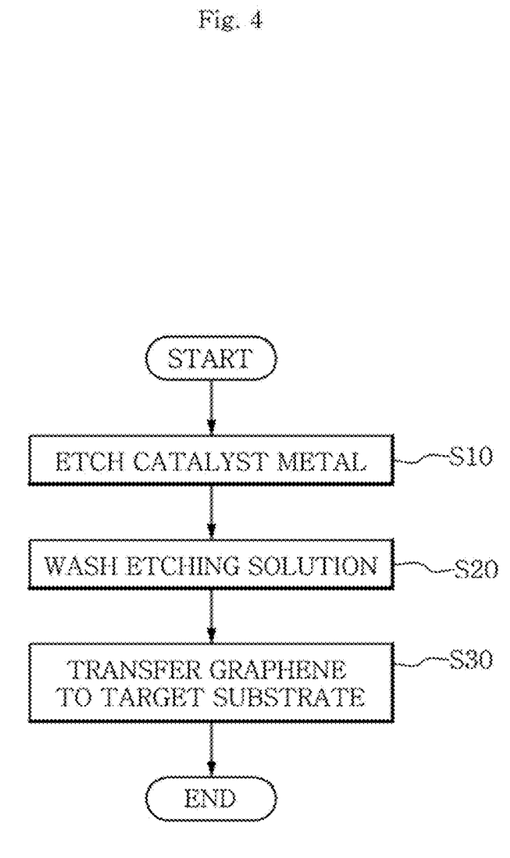
FIG. 4 is a flowchart for illustrating a method for graphene wet transfer according to an embodiment of the present disclosure.

FIG. 4 is a flowchart for illustrating a method for graphene wet transfer according to an embodiment of the present disclosure. Here, the features of FIG. 4 which are already illustrated in FIGS. 1 to 3 will not be described in detail.

Referring to FIG. 4, the method for graphene wet transfer may include: etching a catalyst metal (S10), washing an etching solution (S20), and transferring graphene to a target substrate (S30).

In S10, a barrier structure may be located on the first reservoir filled with an etching solution, and the graphene may be separately located in each separated space of the barrier structure in a floating state in the etching solution, thereby etching the catalyst metal.

At this time, the etching solution may be filled to a certain height of each separated space in order to etch the graphene. In addition, the lower surface of the graphene may be bonded to the catalyst metal, and the upper surface of the graphene may be bonded to the graphene support layer. In this case, the catalyst metal bonded to the lower surface of the graphene in a floating state in the etching solution by the graphene support layer may be etched by the etching solution.

In S20, the barrier structure may be horizontally moved onto the second reservoir filled with a washing solution, thereby washing the etching solution. At this time, the graphene may be continuously separately located in each separated space of the barrier structure in a floating state in the etching solution or the washing solution, while the barrier structure is being carried.

At this time, the barrier structure may be horizontally moved at a predetermined speed in order to minimize damage of the graphene located in each separated space, and a level of the solution in each reservoir may be regularly controlled. In addition, the upper portion of the dividing wall for separating reservoirs from each other may be made of a shielding material in order to minimize movement of the solution filled in each reservoir, while the barrier structure is moving between reservoirs.

In an embodiment, in the method for graphene wet transfer, S20 may be repeated until the etching solution is entirely washed. For example, in this method, in a state where the barrier structure is located on the second reservoir, the etching solution in the first reservoir may be exchanged with a washing solution, and then the barrier structure may be horizontally moved again onto the first reservoir filled with the washing solution, so that the etching solution is washed once again.

In S30, a substrate frame accommodating at least one target substrate may be located on the first reservoir (or, the second reservoir) filled with the washing solution, the barrier structure may be horizontally moved onto the substrate frame, and the washing solution may be discharged from the first reservoir (or, the second reservoir), so that the graphene is transferred to a corresponding target substrate. Each target substrate may be accommodated in each substrate accommodation groove included in the substrate frame.

At this time, each substrate accommodation groove may be configured so that the graphene separately located in each separated space to float in the solution may be transferred to each corresponding target substrate. By doing so, the graphene separately located in each separated space in a floating state in the solution may stably sink as the solution is discharged at a regular speed, and thus the graphene may be transferred to a corresponding target substrate. In an embodiment, the substrate accommodation groove may include a plurality of holes for discharging a solution. In an embodiment, the substrate accommodation groove may have a planar surface with a predetermined slope.

Hereinafter, referring to FIGS. 5*a* to 5*c*, S30 will be described in detail. For convenience, FIGS. 5*a* to 5*c* exaggeratingly show thickness of the graphene and the target substrate and gaps between the barrier structure and the substrate frame, but the scope of the present disclosure is not limited thereto.

Figure 5A:
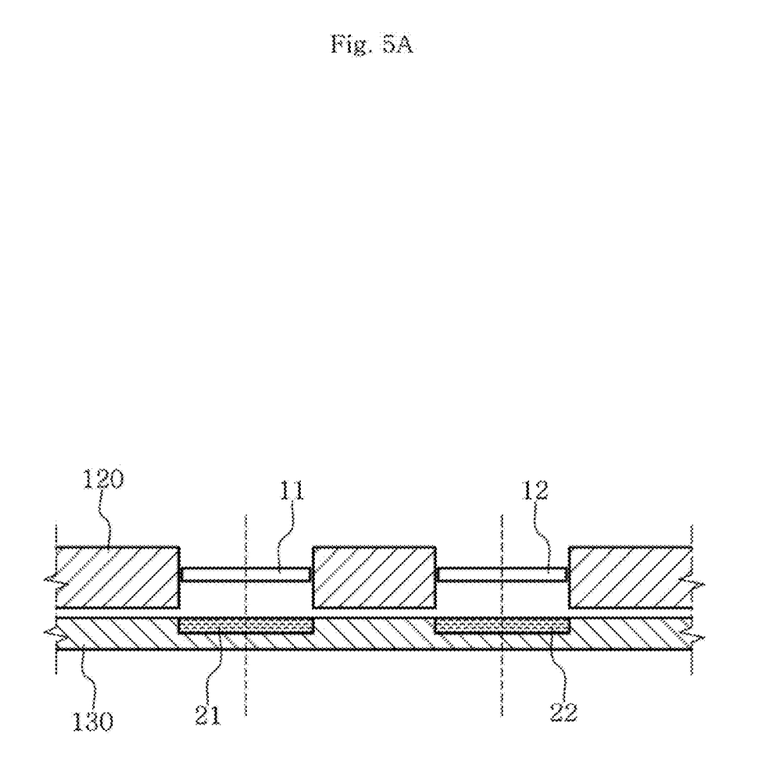
FIGS. 5a to 5c are diagrams for illustrating a process of transferring graphene to a target substrate, based on the cross-sectional view of FIG. 3, according to an embodiment of the present disclosure.

Referring to FIG. 5*a*, after the etching solution is entirely washed, the first graphene 11 and the second graphene 12 may be separately located in a first separated space and a second separated space in a floating in the solution. In addition, the first target substrate 21 to which the first graphene 11 is to be transferred and the second target substrate 22 to which the second graphene 12 is to be transferred may be respectively accommodated in a first substrate accommodation groove and a second substrate accommodation groove.

Figure 5B:
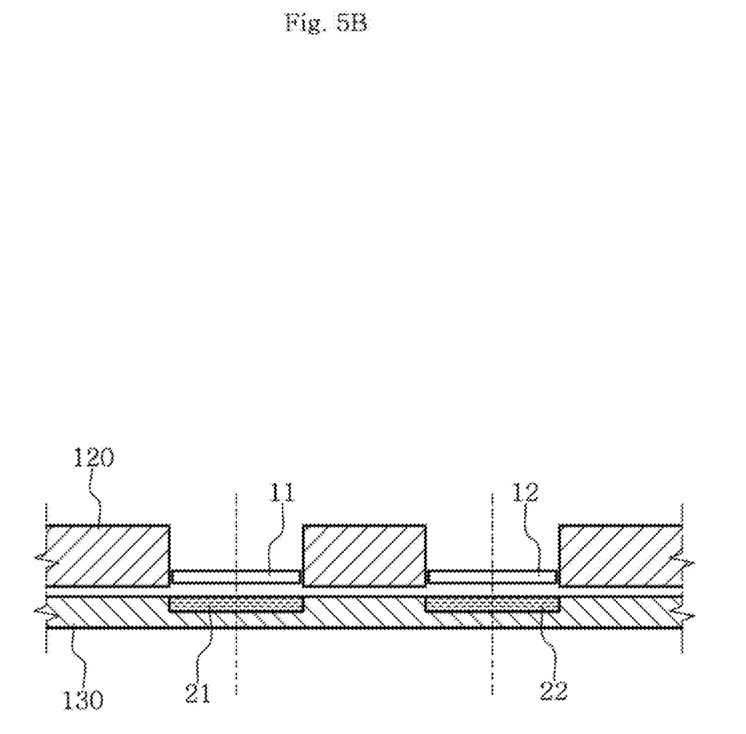

Referring to FIG. 5*b*, as the solution is discharged through the valve, the first graphene 11 and the second graphene 12 may vertically sink in the first separated space and the second separated space, respectively. At this time, since the first graphene 11 and the second graphene 12 stably sink in each separated space while keeping their shapes by the graphene support layer, it is possible to prevent the graphene from being damaged due to discharge of the solution.

Figure 5C:
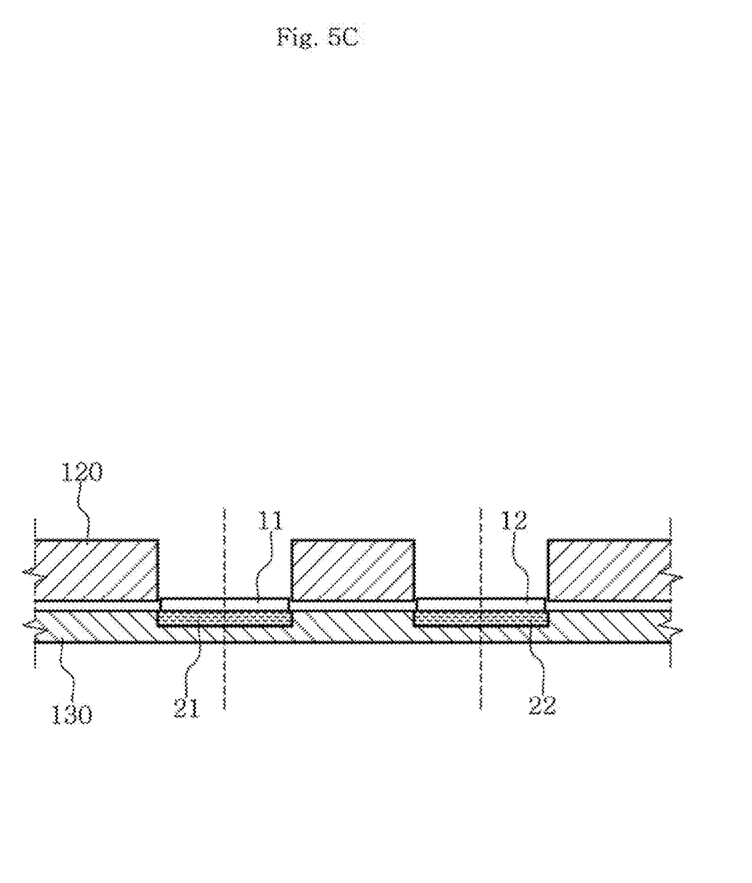

Referring to FIG. 5*c*, as the solution is discharged entirely through the valve, the first graphene 11 and the second graphene 12 may be respectively transferred to the first target substrate 21 and the second target substrate 22. At this time, since each substrate accommodation groove of the first target substrate 21 and the second target substrate 22 has a plurality of holes for discharging the solution, the first graphene 11 and the second graphene 12 may be entirely transferred to the first target substrate 21 and the second target substrate 22, respectively.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

REFERENCE SYMBOLS

| 100: apparatus for graphene wet transfer | 110: reservoir body |
|---|---|
| 120: barrier structure | 130: substrate frame |

What is claimed is:

1. An apparatus for graphene wet transfer, comprising:
a reservoir body having at least two reservoirs;
a barrier structure located on any one of the at least two reservoirs and having at least one separated space formed; and
a substrate frame located between the barrier structure and the reservoir body, and having at least one substrate accommodation groove for accommodating a target substrate to which graphene are transferred,
wherein each reservoir of the at least two reservoirs is filled with a solution for a wet transfer process, and the graphenes are separately located in each separated space in a floating state in the solution.

2. The apparatus for graphene wet transfer according to claim 1, further comprising a moving mechanism configured to allow the barrier structure to move in a horizontal direction between upper portions of the reservoirs.

3. The apparatus for graphene wet transfer according to claim 1,
wherein lower surfaces of the graphenes are bonded to a catalyst metal at which the graphenes are grown, and upper surfaces of the graphenes are bonded to a graphene support layer which supports the graphenes.

4. The apparatus for graphene wet transfer according to claim 1,
wherein each horizontal surface of the separated space has the same vertical axis as each horizontal surface of the substrate accommodation groove corresponding thereto.

5. The apparatus for graphene wet transfer according to claim 4,
wherein an outline of each horizontal surface of the separated space matches with an outline of each horizontal surface of the substrate accommodation groove corresponding thereto.

6. The apparatus for graphene wet transfer according to claim 4,
wherein an area of each horizontal surface of the separated space is equal to or smaller than an area of each horizontal surface of the substrate accommodation groove corresponding thereto.

7. The apparatus for graphene wet transfer according to claim 1,
wherein the substrate accommodation groove has a bottom surface with a predetermined slope.

8. The apparatus for graphene wet transfer according to claim 1,
wherein the substrate accommodation groove has a plurality of holes for draining the solution.

9. The apparatus for graphene wet transfer according to claim 1,
wherein the substrate frame is detachable.

10. The apparatus for graphene wet transfer according to claim 1,
wherein the at least two reservoirs are separated by at least one dividing wall from each other, and
wherein an upper portion of the dividing wall is made of a shielding material in order to minimize movement of the solution while the barrier structure is moving between upper portions of the reservoirs.

11. The apparatus for graphene wet transfer according to claim 1,
wherein each of the at least two reservoirs further includes at least one valve for introducing the solution into the reservoir or discharging the solution out of the reservoir.

12. The apparatus for graphene wet transfer according to claim 1, further comprising a level control pipe connected to each of the at least two reservoirs to adjust a level of a solution filled in each reservoir.

* * * * *